United States Patent
Gustafson et al.

(10) Patent No.: US 9,585,121 B2
(45) Date of Patent: Feb. 28, 2017

(54) METHOD AND APPARATUS FOR SIMULCASTING WITHIN A COMMUNICATION SYSTEM

(75) Inventors: Leslie G. Gustafson, Oakwood Hills, IL (US); Nathanael P. Kuehner, Rolling Meadows, IL (US); Frank D. Panzica, Wilmette, IL (US); Mark Shahaf, Vernon Hills, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 973 days.

(21) Appl. No.: 13/343,761

(22) Filed: Jan. 5, 2012

(65) Prior Publication Data
US 2013/0178218 A1 Jul. 11, 2013

(51) Int. Cl.
*H04B 15/00* (2006.01)
*H04W 72/00* (2009.01)
*H04W 64/00* (2009.01)
*H04W 76/00* (2009.01)

(52) U.S. Cl.
CPC .......... *H04W 72/005* (2013.01); *H04W 64/00* (2013.01); *H04W 76/005* (2013.01)

(58) Field of Classification Search
CPC ......... H04W 68/10; H04W 4/06; H04W 36/28
USPC .................................. 455/502, 503
See application file for complete search history.

(56) References Cited

U.S. PATENT DOCUMENTS

| | | | |
|---|---|---|---|
| 4,506,384 A | 3/1985 | Lucas | |
| 4,972,410 A | 11/1990 | Cohen et al. | |
| 5,263,177 A | 11/1993 | Schieve et al. | |
| 5,423,063 A | 6/1995 | Goldberg | |
| 5,517,690 A * | 5/1996 | Linquist et al. | 455/426.1 |
| 5,594,761 A | 1/1997 | Brown | |
| 5,732,358 A * | 3/1998 | Sawaya et al. | 455/525 |
| 5,963,868 A | 10/1999 | Baek | |
| 5,983,107 A | 11/1999 | Hayashi et al. | |
| 6,141,543 A | 10/2000 | Souissi et al. | |
| 7,986,692 B2 | 7/2011 | McDonald et al. | |
| 8,045,982 B2 | 10/2011 | Khoo et al. | |
| 2006/0025148 A1* | 2/2006 | Karaoguz et al. | 455/452.2 |
| 2006/0099982 A1* | 5/2006 | Nisbet | H04L 12/1881 455/518 |

(Continued)

FOREIGN PATENT DOCUMENTS

EP 0795970 A2 9/1997
WO 9620543 A1 7/1996

OTHER PUBLICATIONS

PCT International Search Report Dated March 15, 2013 for Counterpart Application PCT/US2013/020096.

(Continued)

*Primary Examiner* — Joshua Schwartz

(57) ABSTRACT

A method and apparatus for simulcasting within a communication system is provided herein. During operation, each base site will be equipped with a plurality of radios capable of transmitting on various frequencies. Base sites within the communication system will be capable of communicating on a predetermined number of channels, which may differ among base sites. A number of channels will be shared by the base sites. When a simulcast is desired, the participants are located, and a common channel is determined for communication. Thus, call participant location information is used to determine the best channel to use to meet the group's coverage needs.

17 Claims, 4 Drawing Sheets

(56) References Cited

U.S. PATENT DOCUMENTS

| | | | |
|---|---|---|---|
| 2006/0116149 A1 | 6/2006 | Dunn et al. | |
| 2007/0099639 A1* | 5/2007 | Mege et al. | 455/502 |
| 2007/0249380 A1* | 10/2007 | Stewart | H04B 7/022 |
| | | | 455/502 |
| 2008/0090571 A1* | 4/2008 | Kwong | H04W 36/0066 |
| | | | 455/436 |
| 2010/0103990 A1 | 4/2010 | Residori et al. | |

OTHER PUBLICATIONS

Onali T., et al. "DMR Networks for Health Emergency Management:A Case Study", Wireless Communications and Mobile Computing Conference (IWCMC) 2011 7th International, IEEE, Jul. 4, 2011, pp. 2151-2156; XP031925939; D01: 10.1109/IWCMC.2011.5982867; ISBN:978-1-4244-9539-9.

* cited by examiner

METHOD AND APPARATUS FOR SIMULCASTING WITHIN A COMMUNICATION SYSTEM

FIELD OF THE INVENTION

The present invention generally relates to communication systems, and more particularly to simulcasting voice and/or data within such communication systems.

BACKGROUND OF THE INVENTION

In many communication systems voice and/or data are simulcast by transmitting the same information simultaneously over multiple base sites to multiple radios. Each base site utilizes a same channel, which may comprise a same time/frequency resource. Since data is simulcast on all base sites utilizing a same channel, in practice, all base sites usually have the same channel capacity.

Unfortunately, it would be much more cost-efficient to not have the same channel capacity per site across the entire communication system. In some instances for base sites closer to the edges of the total coverage area user densities are lower and would not require the same number of channels per site to handle the load present in those areas. The cost of a communications system could be greatly reduced if base sites could be equipped with an appropriate number of channels. Therefore a need exists for a method and apparatus for simulcasting voice and/or data that allows base sites to utilize an appropriate number of channels.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
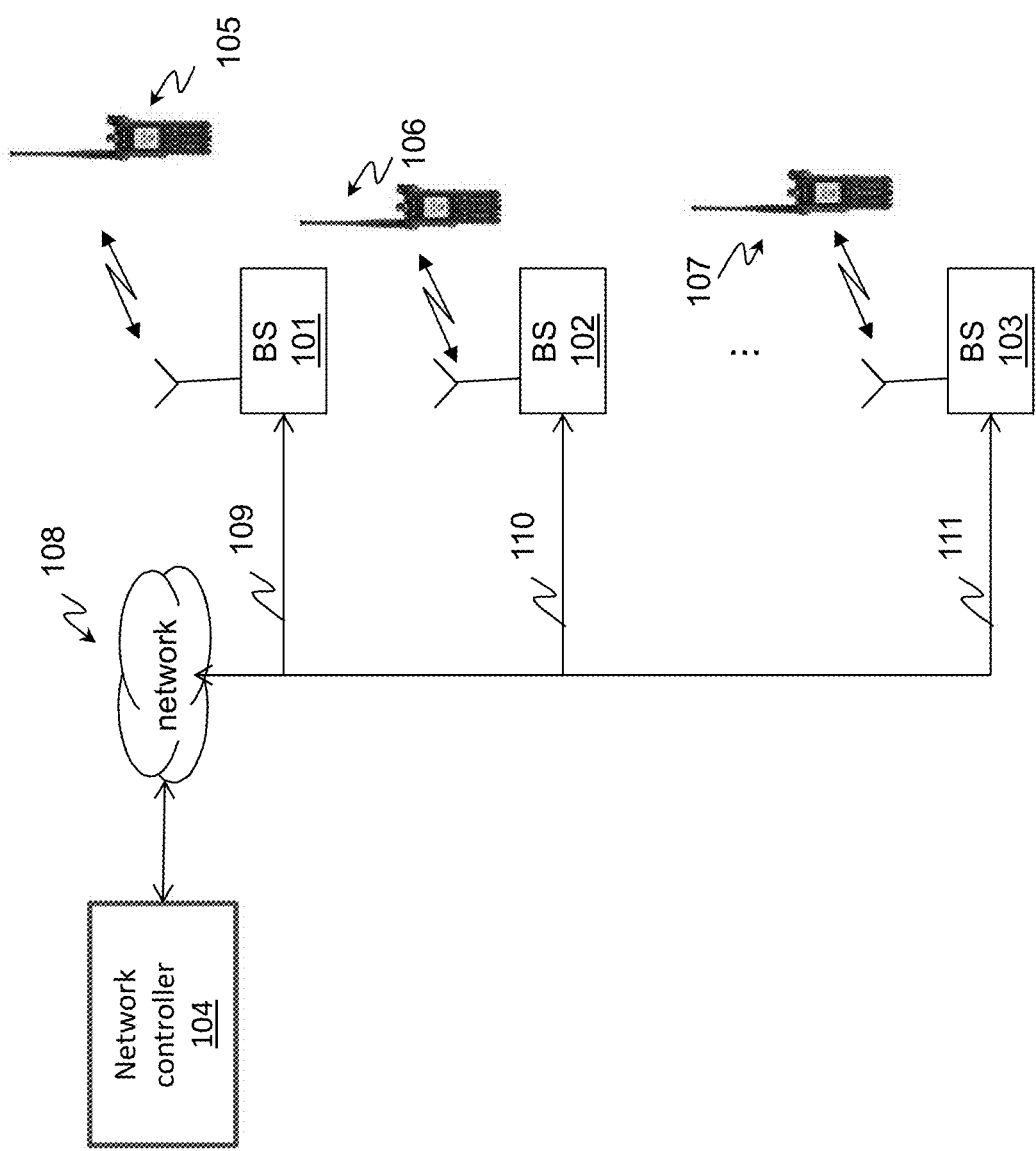
FIG. 1 is block diagram of a communication system capable of simulcasting voice/data.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for simulcasting within a communication system is provided herein. During operation, each base site will be equipped with a plurality of radios capable of transmitting on various frequencies. Base sites within the communication system will be capable of communicating on a predetermined number of channels, which may differ among base sites. A number of channels will be shared by the base sites. When a simulcast is desired, the participants are located, and a common channel is determined for communication. Thus, call participant location information is used to determine the best channel to use to meet the group's coverage needs.

Because the above-described communication system will determine a common channel shared among base sites participating in the simulcast, each base site does not need to be equipped with every available channel used by the communication system. This will allow base sites to have a number of radios tailored to its amount of use. This will greatly reduce costs associated with implementing a communication system capable of simulcasting transmissions.

The present invention encompasses a method for setting up a simulcast call within a communication system. The method comprises the steps of receiving at a network controller, a request to set up the simulcast call, determining by the network controller, radios that will participate in the simulcast call, determining locations for radios participating in the simulcast call, determining base sites participating within the simulcast call, and determining a common channel among base sites participating within the simulcast call. Finally, the determined base sites are instructed to set up the call using the common channel among base sites participating within the simulcast call.

The present invention additionally encompasses a method for setting up a simulcast call within a communication system. The method comprises the steps of receiving at a network controller, a request to e the simulcast call. The request to set up the simulcast call comprises a plurality of radio identifications for radios that will receive the simulcast call. The network controller then determines radios that will participate in the simulcast call from the request, determines locations for radios participating in the simulcast call by receiving location information from the radios that will receive the simulcast call, determines base sites participating within the simulcast call, and determines a common channel among base sites participating within the simulcast call by accessing a database to determine base site/channel associations. The determined base sites are then instructed to set up the call using the common channel among base sites participating within the simulcast call.

Finally, the present invention encompasses an apparatus comprising a database storing base site/channel combinations and logic circuitry. The logic circuitry logic circuitry receives a request to set up the simulcast call, determining radios that will participate in the simulcast call, determines locations for radios participating in the simulcast call, determines base sites participating within the simulcast call, determines a common channel among base sites participating within the simulcast call by accessing the database, and instructs the determined base sites to set up the call using the common channel among base sites participating within the simulcast call.

Turing now to the drawings, wherein like numerals designate like components, FIG. 1 is block diagram of communication system 100 capable of simulcasting voice/data. System 100 generally supports two-way or half-duplex radio communication, such commonly used by police, fire, fleet, and other such organizations. For example TETRA or P25 public safety trunked radio systems. However, in alternate embodiments of the present invention, communication system 100 may comprise any type of communication system, including, but not limited to cellular communication systems, local-area networks, wide-area networks, . . . , etc. System 100 utilizes a plurality of base sites 101-103 which establish an air interface for subscriber radios 105-107 in the vicinity of the base site. Subscriber radios, such as radios 105-107, communicate with base sites 101-103 with which they are affiliated, as controlled by the base site.

As referred to herein, radios 105-107 include, but are not limited to, devices commonly referred to as access terminals, mobile radios, mobile stations, subscriber units, user equipment, mobile devices, or any other device capable of operating in a wireless environment. Examples of wireless communication devices include, but are not limited to, two-way radios, mobile phones, cellular phones, Personal Digital Assistants (PDAs), laptops and two-way pagers.

Network controller 104 receives voice/data from network 108, determines appropriate base sites for simulcasting the voice/data, and provides the voice/data to the appropriate base sites. Network controller 104 is also responsible for instructing base sites 101-103 to the channel to utilize for any transmissions.

Base sites 101-103 are part of a fixed network infrastructure and can receive information (either control or media, e.g., data, voice (audio), video, etc.) in a signal from a radio and transmit information in signals to one or more radios within communication system 100. Base sites 101-103 can also receive information from network 108 via backhaul 109-111. Each base site 101-103 has an appropriate coverage area (see FIG. 2) for communications. Additionally, each base site is equipped to transmit on a number of channels that can differ among base sites. Although the number of channels differs, all base sites share some common channels.

Backhauls 109-111 can be utilized to transmit information from one base site to another or from a base site to other network equipment, such as land-line equipment or network controller 104. Backhauls 109-111 can be hardwired or wireless, and can utilize one of multiple backhaul protocols, such as, but not limited to internet protocol, Multi-Protocol Label Switching (MPLS) protocol, MPLS best effort protocol, E1 protocol, or a very small aperture terminals (VSATs) protocol.

Although network 108 is shown as a single network, in actuality, network 108 may comprise multiple networks, such as, but not limited to wide-area networks, local-area networks, . . . , etc., each network utilizing a different protocol and/or transmission media for transport.

Base sites 101-103 receive channel assignments from network controller 104 and assign channels to various radios 105-107, broadcast control information, and can act as a radio-to-land line interface point. Each base site comprises a base site controller (not shown) and base site transceivers (not shown), along with antennas, power equipment, and other such conventional components, as is known. Base site controller administers operation of the radio interface and keeps track of information necessary for such operation. The base site transceiver includes the radio equipment for modulation and demodulation, frequency generation, timing, and so on.

Each radio 105-107 comprises a radio transceiver (not shown), interface means for operating the radio such as buttons, adjustment knobs, graphical display, as well as audio processing circuitry, memory, and other circuitry and software necessary for operation. Generally, a subscriber radio has a push to talk (PTT) button for commencing transmission to a selected party, talk group, or multi-group. Each radio also has a unique identifier that it uses in communication activity so that the system can identify and address it.

During operation, network controller 104 will determine a need to set up a simulcast transmission to multiple base sites. Not all base sites need to participate in the simulcast transmission. For example, a simulcast transmission may need to be set up for radios 105 and 106 only. When network controller 104 determines that a simulcast transmission is needed, controller 104 instructs the appropriate base sites to utilize a same time/channel combination for transmitting and receiving information from base sites participating in the simulcast call (e.g, uplink and downlink simulcast transmissions). The simulcast call is then set up for the appropriate base sites utilizing a same channel.

As discussed above, since data is simulcast (i.e., the same downlink channel is utilized) on all base sites utilizing a same channel, in prior-art systems, all base sites have the same channel capacity (i.e., the same channels are utilized by all base sites within the communication system). The cost of implementing communication system 100 could be greatly reduced if base sites 101-103 could be equipped with an appropriate number of channels.

In order to address this, each base site 101-103 is equipped with a plurality of radios capable of transmitting on various frequencies/channels. A number of channels will be shared by all base sites; however, not all channels will be available to all base sites 101-103. When a simulcast is desired, the participant location information is used to determine the best channel to use to meet the group's coverage needs.

Figure 2:
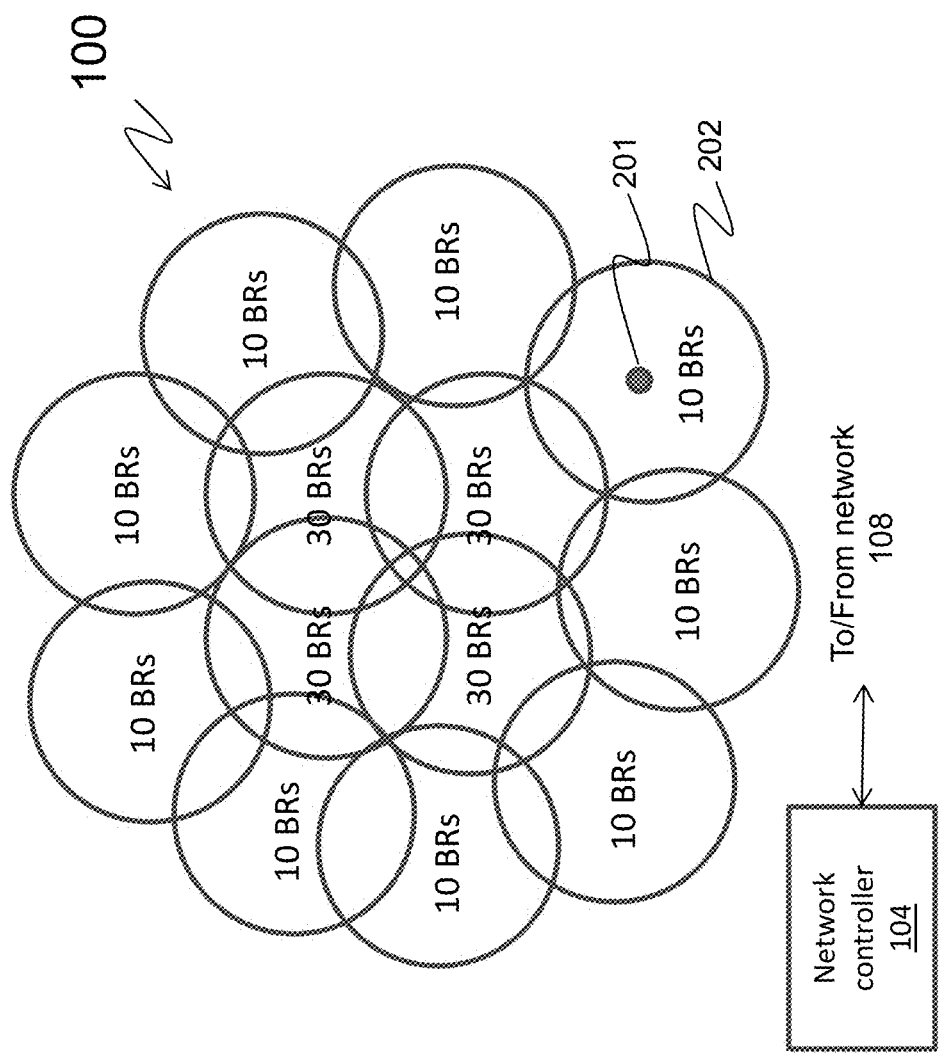
FIG. 2 illustrates base site capabilities.

FIG. 2 illustrates base site capabilities. As shown in FIG. 2, communication system 100 comprises 13 base sites 201 (only one base site is shown and labeled), each having coverage area 202 (again, only one coverage area is labeled). Each base site will be equipped with a number of radios (BR), each capable of utilizing only a particular channel for communications. The number of BRs will differ among base sites. In the present example, those base sites along the outer area of communication system 100 will be equipped with a first number of base site radios (e.g., 10), while those centrally located will be equipped with a second number of base site radios (e.g., 30). As mentioned, each base site radio is capable of communicating on a single channel, which may simply comprise a single frequency pair.

Figure 3:
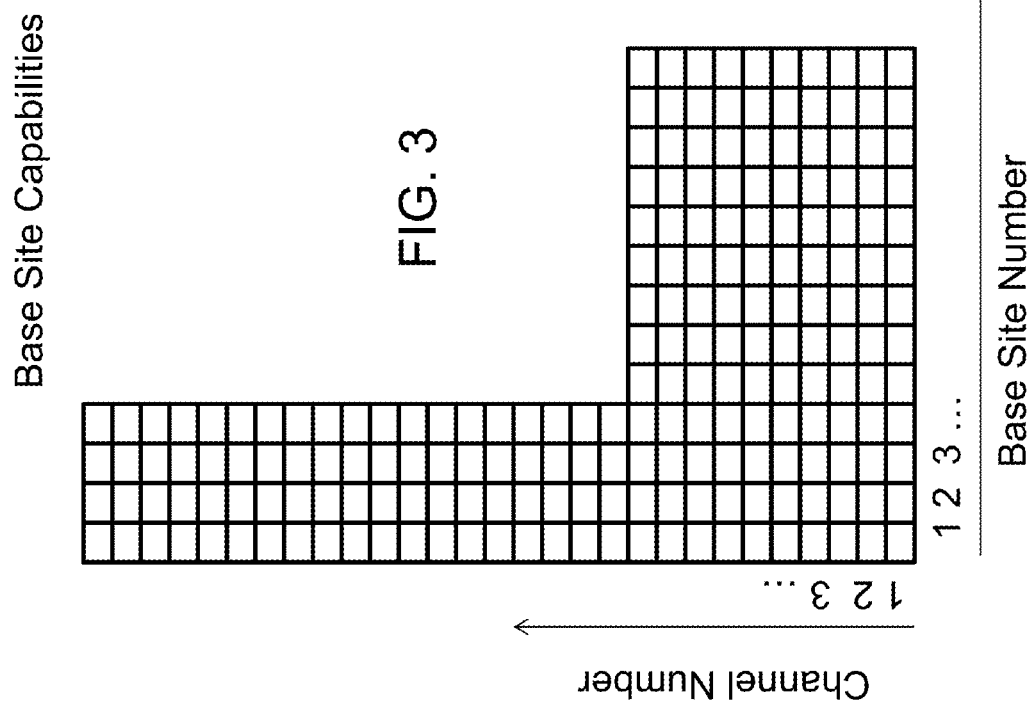
FIG. 3 illustrates channel allocation among base sites.

FIG. 3 illustrates a particular channel allocation among the base sites of FIG. 2, and serves only as one possible example of allocating channels. As shown, base sites 1-4 are equipped to communicate on 30 channels, while the remaining base sites are equipped to communicate utilizing only 10 channels.

The above communication system comprises variable base radio densities at base sites. Because of this, simulcasts calls will need to be directed to channels able to reach all radios that need to be involved with the simulcast call. There are several methods proposed to accomplish this:

A location-based solution may be implemented. In this solution, each radio 105-107 would be equipped with location circuitry (preferably a global positioning system (GPS) radio) that periodically transmits its location. Each radio can then transmit its location data into network controller 104. Network controller 104 would use this information along with predefined coverage maps per channel to determine all radio base site associations.

A registration-based solution may also be implemented. In this solution, each base site would periodically send its unique base site ID on a control channel. The base site identifier would be sent by each base site either at the same time, or one-at-a-time via time-staggered base site steering. Radios 105-107 would use this information to report its base site association back into network controller 104. In the simplest case, where all base sites are transmitting this information at the same time, these messages will be corrupted in simulcast overlap areas. Depending on the RF site topology of the deployment, this corruption may be tolerable as radios will simply report their last known good site ID. In cases where this corruption is not tolerable, time-staggered base site steering may be used.

A group registration-based solution may also be implemented: This method is similar to registration-based solution described above except that base sites are grouped into sub-groupings. Each group of base sites has a unique 'base site group ID' and share the same channels. This reduces the air interface capacity required for base site mobility tracking, at the expense of providing less granular base site mobility information.

A logical-site ID technique may be utilized. In this technique, each base site 101-103 or group of base sites 101-103 has a different logical site ID and network controller 104 assigns each one a different control channel frequency, so that each radio 105-107 sees each base site or group of base sites as a different site. When a radio 105-107 moves from the coverage area of one group of base sites to another, it does a location update. However, for the purpose of assigning traffic channels, network controller 104 treats the entire subsystem as a single logical site, assigning a single traffic channel that provides RF coverage at the group of base sites required to serve all of the radios in the call.

Figure 4:
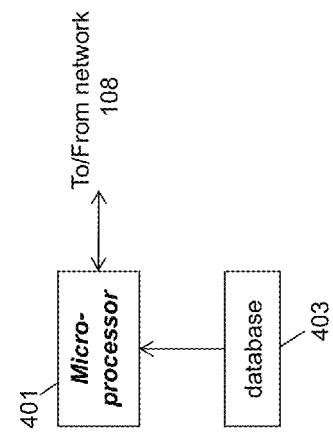
FIG. 4 is a block diagram of a base site controller.

FIG. 4 is a block diagram of network controller 104. As shown, controller 104 comprises microprocessor 401 serving as logic circuitry to control the functionality of network controller 104. Microprocessor 401 comprises a digital signal processor (DSP), general purpose microprocessor, a programmable logic device, or application specific integrated circuit (ASIC)

Database 403 comprises standard random access memory and is used to store information related to what channels are available for each particular base site within communication system 100.

Figure 5:
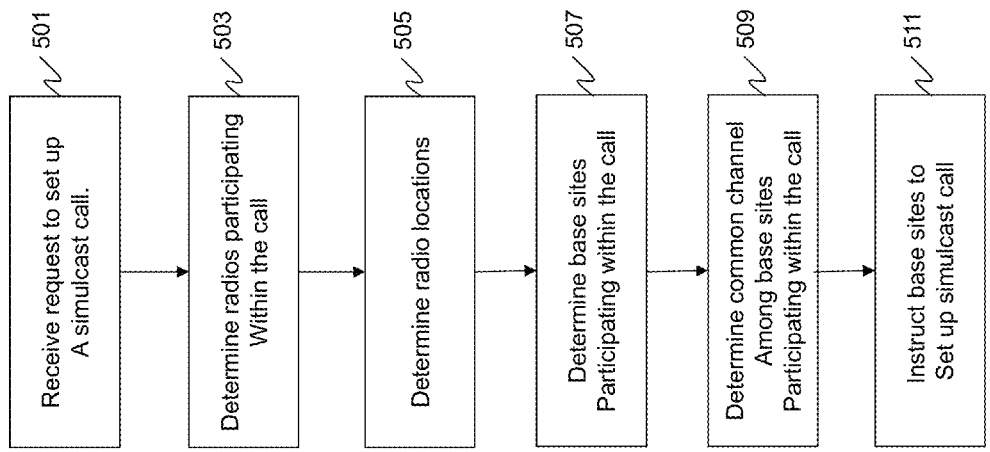
FIG. 5 is a flow chart showing operation of the base site controller.

FIG. 5 is a flow chart showing operation of network controller. 104. The logic flow begins at step 501 where logic circuitry 401 receives a request to set up a simulcast call among various base sites 101-103. The request may be received from a radio (via its base site) or via another entity (e.g., a dispatch center) coupled to network 108. As discussed above, the request to set up the simulcast call preferably comprises a plurality of individual radio identifications for radios that will receive the simulcast call. Alternatively, the request to set up the call comprises a group identification associated with the radios that will participate in the simulcast call.

Logic circuitry 401 then analyzes the request and determines individual radio identities that will be participating in the simulcast call. This may determined from the request itself, where individual radio identities are provided with the request. The identities provided with the request may be in the form of a unique radio identification, or may be an identification for a group of radios (group ID). When a group ID is provided, logic circuitry 401 will access database 403 to determine radios associated with the group ID. Radio/group information can be stored in table form within database 403.

Once logic circuitry 401 determines radios participating within the simulcast call, logic circuitry 401 determines a location for each radio participating within the call (step 505). The locations may comprise an actual geographic coordinate (geographic location) for each radio participating in the simulcast call, or alternatively may simply comprise a base site associated with a each radio participating in the simulcast call, determined from each radio periodically reporting this information. Thus, in one embodiment of the present invention the determination of location information for each radio may be made by receiving the location information directly from the radios that will receive the simulcast call.

Regardless of how the location of participant radios is determined, once determined, logic circuitry 401 accesses database 403 to determine base sites that will participate in the simulcast call (step 507). In one embodiment, the step of determining base sites participating within the simulcast call comprises the step of determining the base sites by associating the location of the radio with a base site.

Once base sites are identified, a common channel (e.g., a common uplink and a common downlink frequency) among all base sites participating within the simulcast is determined by logic circuitry 401 (step 509). This is preferably accomplished by again accessing database 403 where each base site and its available channels are stored (i.e., base site/channel associations). Finally, the logic flow continues to step 511 where each base site participating in the call is instructed by logic circuitry 401 to set up the simulcast call utilizing the identified uplink and downlink channels.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separately claimed subject matter.

What is claimed is:

1. A method for setting up a simulcast call within a communication system, the method comprising the steps of:
    receiving at a network controller, a request to set up the simulcast call;
    determining by the network controller, radios that will participate in the simulcast call;
    determining locations for radios participating in the simulcast call;
    determining a same common channel among base sites participating within the simulcast call, wherein; each base site participating within the simulcast call will be equipped with a number of radios (BR), at least two participating base sites will have different channels from each other; each BR capable of utilizing only a single channel for communications, and wherein a first base site participating within the simulcast call will be equipped with a first number of BRs, and a second base site participating within the simulcast call will be equipped with a second number of BRs, and wherein the first and the second base sites use a first and a second BR to participate in the call, and wherein the first and the second BR use the same channel for a downlink simulcast transmission; and
    instructing the base sites participating in the call, having the common channel, to set up the call using the common channel among base sites participating within the simulcast call.

2. The method of claim 1 wherein the request to set up the call comprises a group identification associated with the radios that will participate in the simulcast call.

3. The method of claim 1 wherein the request to set up the call comprises individual radio identifications for radios that will participate in the simulcast call.

4. The method of claim 1 wherein the locations for radios participating in the simulcast call comprises a base site associated with each radio participating in the simulcast call.

5. The method of claim 1 wherein the locations for radios participating in the simulcast call comprises a geographic location.

6. The method of claim 1 wherein the common channel comprises a common uplink and a common downlink frequency.

7. A method for setting up a simulcast call within a communication system, the method comprising the steps of:
    receiving at a network controller, a request to the simulcast call, wherein the request to set up the simulcast call comprises a plurality of radio identifications for radios that will receive the simulcast call;
    determining by the network controller, radios that will participate in the simulcast call from the request;
    determining locations for radios participating in the simulcast call by receiving location information from the radios that will receive the simulcast call;
    determining a same common channel among base sites participating within the simulcast call by accessing a database to determine base site/channel associations wherein each base site participating within the simulcast call will be equipped with a number of radios (BR), at least two participating base sites will have different channels from each other, each BR capable of utilizing only a single channel for communications, and wherein a first base site participating within the simulcast call will be equipped with a first number of BRs, and a second base site participating within the simulcast call will be equipped with a second number of BRs, and wherein the first and the second base sites use a first and a second BR to participate in the call, and wherein the first and the second BR use the same common channel for a downlink simulcast transmission; and instructing the base sites having the common channel to set up the call using the common channel among base sites participating within the simulcast call.

8. The method of claim 7 wherein the request to set up the call comprises a group identification associated with the radios that will participate in the simulcast call.

9. The method of claim 7 wherein the locations for radios participating in the simulcast call comprises a base site associated with each radio participating in the simulcast call.

10. The method of claim 7 wherein the locations for radios participating in the simulcast call comprises a geographic location.

11. The method of claim 7 wherein the common channel comprises a common uplink and a common downlink frequency.

12. An apparatus comprising:
a database storing base site/channel combinations; and
logic circuitry receiving a request to set up the simulcast call, determining radios that will participate in the simulcast call, determining locations for radios participating in the simulcast call, determining a same common channel among base sites participating within the simulcast call by accessing the database, and instructing the base sites having the common channel to set up the call using the common channel among base sites participating within the simulcast call, wherein each base site participating within the simulcast call will be equipped with a number of radios (BR), at least two participating base sites will have different channels from each other, each BR capable of utilizing only a single channel for communications, and wherein a first base site participating within the simulcast call will be equipped with a first number of BRs, and a second base site participating within the simulcast call will be equipped with a second number of BRs, and wherein the first and the second base sites use a first and a second BR to participate in the call, and wherein the first and the second BR use the common channel for a downlink simulcast transmission.

13. The apparatus of claim 12 wherein the request to set up the call comprises a group identification associated with the radios that will participate in the simulcast call.

14. The apparatus of claim 12 wherein the request to set up the call comprises individual radio identifications for radios that will participate in the simulcast call.

15. The apparatus of claim 12 wherein the locations for radios participating in the simulcast call comprises a base site associated with each radio participating in the simulcast call.

16. The apparatus of claim 12 wherein the locations for radios participating in the simulcast call comprises a geographic location.

17. The apparatus of claim 12 wherein the common channel comprises a common uplink and a common downlink frequency.

* * * * *